3,021,321
PROTEIN DERIVATIVES
Harland H. Young, Western Springs, and Prince G. Harrill, Chicago, Ill., assignors to Swift & Company, Chicago, Ill., a corporation of Illinois
No Drawing. Filed Sept. 8, 1958, Ser. No. 759,443
10 Claims. (Cl. 260—117)

The present invention relates to carbamido-protein derivatives and to methods of preparing such products. More particularly, the present invention is directed to the treatment of proteinaceous materials with ureau under conditions at which urea decomposes to form ammonia gas and isocyanic acid, whereby substituted urea compounds or carbamyl protein derivatives are obtained.

In the past, substituted carbamido-protein derivatives have been prepared by reacting proteinaceous materials with esters of isocyanic acid such as phenyl isocyanate. These esters, however, are unstable and react with moisture so that the reaction must be carried out in the absence of water. Additionally, the substituted urea products obtained from this reaction are, under certain circumstances, resistant to further treatment, e.g. resinification with formaldehyde. Finally, they are highly moisture resistant and water insoluble, thereby limiting their usefulness to a few applications.

A method is described in Patent No. 2,816,099 whereby carbamyl or carbamido-protein derivatives (proteinyl urea compounds are prepared without the use of isocyanic esters. In this process, protein materials are treated with isocyanic acid, the latter reactant being generated in situ from a suitable salt or other compound. In this method, however, the amount of potassium cyanate or other salt used as a source of isocyanic acid must be carefully controlled because of its high cost and excessive alkalinity. Furthermore, it is necessary to use a water soluble or water dispersible protein in the reaction. The evolution of isocyanic acid gas caused by adding a solution of potassium cyanate or other salt to an acidified protein solution also creates problems in this method. The rate of reaction of the liberated isocyanic acid gas with the protein molecule is slower than the rate at which the gas escapes from solution at 100° F. Therefore, a considerable excess of cyanate salt must be used in the method described in Patent No. 2,816,099 in order to compensate for this loss. The use of excess salt caused an increase in the inorganic ash content of the finished proteinyl urea in addition to the loss or waste of expensive reagent.

It is an object of the present invention, therefore, to provide an improved and less costly method of preparing substituted urea compounds.

Another object of the present invention is to provide a method of preparing substituted urea compounds from water-insoluble protein materials.

A further object of the present invention is to provide substituted urea compounds which can be reacted with substantial amounts of suitable aldehydes without incurring gelation and without producing a water-insoluble product.

Other objects of the invention will become apparent to those skilled in the art from the following detailed description of the process and product.

In general, the present invention is directed to proteinyl urea compounds and to methods of preparing such compounds wherein isocyanic acid which is to be reacted with protein materials is generated in situ through the pyrolysis or dearrangement of urea. The use of urea for this purpose can be accomplished by one of the following techniques:

(1) Urea is dissolved in an aqueous protein solution. The solvent is then removed by a drying step followed by an optional grinding step. The material is then heated to a temperature above the decomposition point of urea and held at that temperature long enough to allow ammonia to be evolved and isocyanic acid to react uniformly with the protein material.

(2) Water-insoluble but moisture-absorbent proteins are soaked in aqueous urea solutions until the urea is uniformly dispersed throughout the protein material. Excess liquid is then drained and after the urea-treated protein material is dried the product is subjected to the same heat treatment as is described in No. 1 above.

(3) Water-insoluble proteinaceous material is mixed with urea with or without added moisture, and the mixture is subjected to temperatures under pressure at which urea decomposes, generating ammonia gas and nascent isocyanic acid which reacts with the proteins.

It is well known in the art to use urea or related compounds as peptizing agents to retard the rate of gelation and to lower the congealing temperature of protein compositions. In the instant case, however, we use urea as a reactant rather than as a peptizing agent and little, if any, unreacted urea is present in our final products to account for their properties.

Urea or carbamide is a white, crystalline product which is readily available in commercial quantities at low cost. Urea melts at 132.7° C. and at this temperature, or somewhat lower, it tends to decompose as follows:

$$NH_2CONH_2 \rightleftharpoons NH_3 + H-N=C=O$$

When urea is dispersed in a protein solution and that solution is dried, the decomposition of urea may take place at a lower temperature than 132.7° C. In certain instances we have found that some dearrangement occurs at as low a temperature as 120° C. The released isocyanic acid is highly reactive and will add to undissociated urea to form biuret, triuret or one of many other complicated polymeric reaction products. By following one of the three techniques described above, however, urea is sufficiently dispersed throughout a protein medium rich in reaction centers for isocyanic acid to prevent the formation of such products. In this way, an efficient and low cost system is set up wherein substituted urea compounds are prepared by merely raising the temperature of urea beyond its decomposition point.

In procedures No. 1 and No. 2 above, the carbamidation of the protein is carried out without a drastic hydrolytic breakdown of the protein molecule itself. Where moisture and ammonia by-products are present in method No. 3, however, the proteins are hydrolyzed to a considerable extent.

Procedure No. 1 is particularly well suited to the carbamidation of glue, gelatin, blood, casein, egg albumin, blood albumin, lactalbumin, vegetable seed proteins such as soybean, peanut and cottonseed proteins, and other proteins that are either soluble in water or soluble in concentrated solutions of urea.

Procedure No. 2 may be used with proteinaceous materials that tend to hydrate but which are not readily soluble. Such proteins include vegetable seed meal, casein, tissue meats, offal, and the like.

Procedure No. 3 is advantageously employed when the protein source is hoofs, horns, feathers, hair and hide trimmings which retain hair, bristles, wool, etc. These substances can also be processed according to procedure No. 2, but for ultimate use as livestock and poultry feeds, procedure No. 3 entails less handling, time, and equipment costs.

The following examples are illustrative of the present invention and serve to distinguish our process and product from the prior art use of urea as a peptizing agent for proteins and from the products and process described in Patent No. 2,816,099.

*Example I*

Bone glue testing 150 gm. Bloom was dissolved in water to form a 35% solution. After the addition of 10% urea, based on the weight of the dissolved glue solids, the solution was chilled to 35° F. to form a gel. This material was then dried in an air tunnel until the moisture content was 10–12%. The dried sheets, which consisted of 10% moisture, 81% glue, and 9% urea were ground sufficiently to pass a 10 mesh screen. This master batch was divided into a number of small lots and subjected to dry heating at various temperatures from 105° to 135° C. As the time and temperature of the heat treatment was increased, the following changes in the properties of the material were observed:

(a) The solubility of the product in water at room temperature increased.

(b) The amount of urea present as such decreased. No urea was present when the product was heated to 135° C. for four hours or more.

(c) The solubility of the product in aqueous solutions of organic solvents increased with the severity of the treatment.

(d) The improvement in water solubility of the material was demonstrated by determining the temperature of gelation for the sample heated at 135° C. for three hours at different concentrations.

| Percent Solids | Product of Patent No. 2,816,099 | Bone Glue Control | Carbamido-glue, 3 hours at 135° C. |
|---|---|---|---|
| | °F. | °F. | °F. |
| 20 | 85 | 85 | 60 |
| 40 | 100 | 100 | 70 |
| 60 | 110 | 110 | 85 |

*Example II*

Bone glue testing 150 gm. Bloom was dissolved in water and treated with 10% urea as was described in Example I. The dried and ground mixture was heated at 135° C. for five hours, after which time its susceptibility to precipitation by organic solvents was examined as follows:

A 5% solution of modified glue was prepared along with a control glue solution of the same concentration. Various organic solvents were added to 100 cc. portions of each solution until it was apparent that the dissolved proteinaceous material in each portion had precipitated. The following table shows the amount of organic solvent which had been added to the various portions of each solution at the precipitation point:

| Organic Solvent | Cc. of organic solvent required to begin precipitation of the protein from 100 cc. of its 5% solution | |
|---|---|---|
| | Bone glue control | Carbamido-glue |
| Methanol | 20 | 170 |
| Ethanol | 30 | 140 |
| Isopropanol | 35 | 80 |
| Ter-butanol | 35 | 65 |
| Acetone | 35 | 70 |
| Methyl ethyl ketone | 30 | 40 |
| Dioxane | 30 | 50 |

The product of U.S. Patent No. 2,816,099 required more solvent than the control but considerably less than the subject carbamido-glue.

It is evident that carbamido-glue is considerably more soluble in aqueous solutions of common organic solvents than is the unmodified product.

*Example III*

This example demonstrates the differences which exist between modified and unmodified bone glue as shown by its behavior toward trivalent metal salts which are normally used in tanning proteinaceous material.

Bone glue testing 150 gm. Bloom was dissolved in water and treated with 10% urea as is described in Example I. The product was ground, dried to 10% moisture, and then heated at 135° C. for five hours. The modified product was then made up into two solutions, one containing 11% carbamido-glue and the other containing 20% carbamido-glue. Solutions containing unmodified glue were similarly prepared. The four solutions were adjusted to various pH readings and were then treated with from 1% to 5% of aluminum sulfate. The changes which took place in the viscosity of the solutions after the treatment with aluminum sulfate are set forth in the following tables:

| Concentration | Unmodified Bone Glue | | | | | |
|---|---|---|---|---|---|---|
| | 10% Solution | | | 20% Solution | | |
| pH | 4.0 | 6.0 | 8.0 | 6.0 | 6.0 | 8.0 |
| 1% $Al_2(SO_4)_3$ basis protein | 48 | 58 | 64 | 410 | 440 | 540 |
| 2% $Al_2(SO_4)_3$ basis protein | 50 | 57 | 69 | 460 | 460 | 830 |
| 3% $Al_2(SO_4)_3$ basis protein | 60 | 60 | 69 | 690 | 520 | 2,700 |
| 5% $Al_2(SO_4)_3$ basis protein | 48 | 67 | 106 | 470 | 1,780 | 4,500 |

| Concentration | Modified Bone Glue | | | | | |
|---|---|---|---|---|---|---|
| | 10% Solution | | | 20% Solution | | |
| pH | 4.0 | 6.0 | 8.0 | 4.0 | 6.0 | 8.0 |
| 1% $Al_2(SO_4)_3$ basis protein | insol. | 33 | 39 | 290 | 240 | 220 |
| 2% $Al_2(SO_4)_3$ basis protein | 31 | 34 | 39 | 390 | 250 | 260 |
| 3% $Al_2(SO_4)_3$ basis protein | 41 | 37 | 41 | 370 | 230 | 310 |
| 5% $Al_2(SO_4)_3$ basis protein | 31 | 31 | 36 | 520 | 450 | 290 |

The viscosity readings are given in millipoises. All of the determinations were made at a constant temperature of 140° F. In general, it is apparent that modified glue is much less subject to the tanning effect of aluminum ions than is control bone glue. The insolubility of the modified bone glue with 1% aluminum sulfate at a pH of 4.0 was a coincidental arrival of the isoelectric point of the material which caused a complete precipitation of the product. The viscosity increase was found to be a function of both pH and aluminum ion concentration.

*Example IV*

Five hundred (500) gm. of 250 gm. Bloom test animal glue was dissolved in 1000 gm. of water by first soaking for two hours at room temperature and then heating the mixture to 130° F. Fifty (50) gm. of urea was dissolved in the warm liquor, and the solution was chilled in shallow pans until a stiff gel was obtained. The gel was dried in a stream of air at room temperature until brittle and then ground to pass a 10 mesh screen. The dry ground product was divided into two portions, one of which was held at 135° C. and the other at 150° C. After three hours at 135° C., the product dissolved completely in water at room temperature at a solids level of 30%. At 150° C. only one hour was required to obtain the same solubility.

*Example V*

This test was carried out as in Example IV except that three grades of glue were heated to 135° C. and 150° C. The three glues tested 350 gm., 250 gm., and 150 gm. Bloom. The results obtained with 35% solutions are shown in the following table:

| Bloom Test of Glue | Temp. of Heating with Urea, °C. | Hours of Heating | 35% Soln. in Water | Shear Strength, lbs./in. | Temp. of Gelation, °F. |
|---|---|---|---|---|---|
| 350 | 135 | 1 | Insoluble | | |
| 350 | 135 | 3 | ---do | | |
| 250 | 135 | 1 | ---do | | |
| 250 | 135 | 3 | Soluble | 1,890 | 70 |
| 150 | 135 | 1 | ---do | 2,050 | 70 |
| 150 | 135 | 3 | ---do | 2,110 | 60 |
| 350 | 150 | 1 | Insoluble | | |
| 350 | 150 | 3 | Soluble | 2,320 | 70 |
| 250 | 150 | 1 | ---do | 1,970 | 80 |
| 250 | 150 | 3 | ---do | 1,330 | 60 |
| 150 | 150 | 1 | ---do | 1,810 | 70 |
| 150 | 150 | 3 | ---do | 1,080 | 60 |

It is apparent from the above that, irrespective of the grade of glue treated, the modified end products are substantially the same. In other words, the following are equivalent with respect to solubility, temperature of gelation, and adhesive strength:

250 gm. glue modified for 3 hours at 135° C.
150 gm. glue modified for 1 hour at 135° C.
150 gm. glue modified for 3 hours at 135° C.
350 gm. glue modified for 3 hours at 150° C.
250 gm. glue modified for 1 hour at 150° C.
150 gm. glue modified for 1 hour at 150° C.

*Example VI*

One hundred fifty (150) gm. Bloom gelatin (equivalent in test to 450 gm. glue) was made up into a 25% solution and treated with 10% of urea based on the weight of the gelatin. The solution was chilled to a gel and dried at room temperature. After grinding, the dry product was heated for five hours at 135° C. The resulting material was somewhat darker in color than the original gelatin but was soluble in water at 75° F. Gelation temperatures for solutions of different concentrations were as follows:

°F.
10% concentration _____ 75
20% concentration _____ 85
30% concentration _____ 95

The average molecular weight of the carbamido-gelatin as determined by osmotic pressure measurements was found to be 13,300. Inasmuch as this molecular weight is in the range of that reported for oxypolygelatin and because the latter product is used as a blood plasma extender, the following experiment was run to indicate a possible use for this new derivative.

Fourteen (14) cc. of a sterile saline solution containing .091 gm. of the carbamido-gelatin per cc. of solution was injected intravenously into a dog. No effect on the rectal temperature of the animal was noted. The injection was repeated on the second day, and double the amount was injected on the third day. In the three days the dog received 56 cc. of solution containing 5.1 gm. of carbamido-gelatin. No deleterious effect on the dog and no change in the rectal temperature were noted.

While this test is not conclusive proof as to the adequacy of this material as an extender for blood plasma, it is indicative of its possibilities in such a field of application. The fluidity of concentrated solutions at body temperature, its relatively high molecular weight, the ease of storage and transportation of the dry, sterile product, and its low cost would justify further work to evaluate carbamido-gelatin as an extender for blood plasma similar to oxypolygelatin, polyvinyl pyrollidone, and dextran preparations.

*Example VII*

Fresh frozen pork skins were thawed in cold water and fleshed to remove excess adipose tissue. They were then soaked in aqueous urea solutions varying in concentration from 10% to 50% urea for 72 hours at 40° F. The skins were drained and dried at room temperature, rendered fat being washed off with a petroleum solvent. Final drying was effected at 105° C. for two hours. The dried product was ground and heated at 135° C. for three hours. Material modified in this manner became increasingly soluble in water with each increase in urea concentration. Samples containing no free urea after heating were nonhygroscopic, but those containing excess urea which had not completely pyrolyzed were hygroscopic and were similar to dried films of liquid glues containing urea as the liquefier.

*Example VIII*

Fresh beef blood was mixed with 10, 20, 30, and 50% urea on a solids basis. The products were dried in a stream of air at room temperature. The materials were then heated dry for five hours at 135° C. and 150° C. Lots containing 10% and 20% urea required higher temperatures (150° C.) to promote solubility in water whereas those containing 30% and 50% urea were quite soluble after heating at 135° C.

*Example IX*

Five thousand (5000) gm. of fresh whey containing 350 gm. of solids was treated with 50 gm. urea and dried in pans. The dried powder was heated at 135° C. for four hours, producing a final product which was soluble in water. Evaporation of the solution yielded a caramel colored, water soluble syrup.

*Example X*

One hundred (100) gm. of casein was dissolved in 300 gm. of water made alkaline with sodium hydroxide. The pH of the solution was adjusted to 7.2, and 10 gm. of urea was added. After drying at room temperature, the product was heated for four hours at 135° C. The resulting material was readily soluble in water and a 35% solution was fluid at 120° F. but gelled at 75° F.

*Example XI*

Cattle hoofs were soaked and warmed in a 15% urea solution for five hours during which time considerable swelling took place. The soaked hoofs were drained on a screen and dried at 100° C. followed by four hours of heating at 135° C. The final product readily absorbed water and also, to a large extent, was soluble in water.

*Example XII*

Hog hair was treated as described in Example XI and heated directly to 135° C., and held at that temperature for four hours at which time the reaction was complete. The final product was a friable powder which absorbed but did not dissolve appreciably in water.

When the reaction between urea and the protein was carried out in the presence of moisture and under sufficient pressure to permit the development of temperatures above 120° C., the reaction was found to proceed more readily with or without agitation yielding products which were soluble and digestible.

The following examples are illustrative of technique number 3 which is used to modify certain water-insoluble proteins.

*Example XIII*

Fifteen (15) pounds cattle hoofs, 15 pounds cattle snouts, lips, and ears (with hair on), and 5 pounds of hog hair were placed in a pressure vessel equipped with a propeller-type agitator. After adding 1¾ pounds of urea, the mass was heated under 65 pounds per square inch steam pressure for three hours with agitation. The final product was essentially fluid but contained a considerable amount of comminuted and suspended solids. When dry, the product resembled a high-grade meat meal which was found to contain 12.25% nitrogen at 8% moisture basis which is equivalent to 76.5% protein. Preliminary feeding tests indicated that this material was readily utilizable as a protein supplement.

Example XIV

Twenty-six hundred (2600) pounds of cattle snouts, lips, and ears, including the hair, were mixed with 130 pounds of urea and put in a pressure tank not equipped with mechanical agitation. The mass was heated by direct injection of steam under 65 p.s.i. pressure, and the temperature was held for three hours at 290°–300° F. At the end of this time the liquid was blown down and run through a vacuum evaporator to yield a heavy syrup (75%) containing some suspended solids. When dry, this product was found to include 14% nitrogen on an 8% moisture basis and was devoid of any hair or water insoluble material.

Example XV

Twelve (12) pounds of chicken offal containing the heads, feet, blood, viscera, and feathers from 10 chickens was mixed with 300 gm. of urea and treated as in Example XIII. The reaction mass was screened and found to contain only a trace of insoluble solids. When dry, the final product on an 8% moisture basis ran 68% protein equivalent, 12.2% fat, 2.18% $P_2O_5$, and 7.4% ash, approximately 51% of which was tricalcium phosphate (bone ash).

In all of the examples given above, the final products were free from unreacted urea as determined by examination of their alcohol extracts. Additional evidence as to the carbamidation of the proteins involved is shown by the subsequent reaction of some of these materials with aldehydes.

The following examples describe the reaction of carbamido-glue with various aldehydes and outlines the properties of the products obtained.

Example XVI

One hundred fifty (150) gm. Bloom bone glue was dissolved in water, treated with 10% urea basis glue, dried, ground, and heated for three hours at 135° C. The final carbamido-glue was made up into a 35% solution in water and warmed to 120° F. The pH was lowered from 6.0 to 4.5 with 25% sulfuric acid, and a solution of formaldehyde in water (7.4% concentration) was added until the final solutions contained 0, 0.185, 0.37, 0.74, 1.11, 1.48, and 1.85% formaldehyde basis carbamido-glue solids respectively. These solutions were stirred mechanically for ten minutes at 120° F., and then each was divided into two equal portions. One set was allowed to dry, and the other was held at 120° F. in closed containers for one week. (This later procedure was designed to determine whether or not the aldehyde reaction would slowly cause the product to become insoluble.)

All samples held in solution at 120° F. remained soluble as did all of the dried samples except those treated with 1.48% and 1.85% formaldehyde. The samples held in solution at 120° F. which had been treated with 1.48% and 1.85% formaldehyde remained soluble until they were dried, at which point they become insoluble. Those dried products which were soluble were redissolved and used to adhere maple blocks with the following results:

| Product | Percent Formaldehyde basis glue derivative | Av. Shear Strength in lbs./in.² |
|---|---|---|
| Parent bone glue | 0.0 (control) | 1,800 |
| Carbamido-glue | 0.0 (control) | 1,600 |
| Do | 0.185 | 1,700 |
| Do | 0.37 | 1,300 |
| Do | 0.74 | 1,800 |
| Do | 1.11 | 2,100 |

Example XVII

This test was conducted as in Example XVI except that the carbamidation was carried on for four hours at 135° C. The reaction products were held in solution with the aldehyde for two weeks at 120° F. in order to check their continued solubility.

Samples reacted with 1.85%, 2.2%, and 2.6% formaldehyde basis carbamido-glue were soluble as long as they were maintained as solutions. At levels of 1.85% formaldehyde and above, the dried films were insoluble. At levels of 2.2% and 2.6% formaldehyde, there was an increase in viscosity but fluidity was maintained at 120° F. Chilling to 75° F. produced gels which remelted when warmed again to 120° F.

In Examples XVI and XVII it was demonstrated that by "carbamidating" the glue protein we increased its tolerance toward formaldehyde sufficiently to permit the formation of a material which remained soluble as long as it was moist but which converted to an insoluble form when dried. The product also showed on increased adhesive strength.

Example XVIII

Carbamido-glue prepared according to Example XVII was allowed to react with an 8.7% solution of acrolein at 120° F. to produce a series of products containing from 0 to 6% acrolein basis carbamido-glue. All remained soluble, wet or dried, except for the 6% acrolein which was insoluble when dry but soluble when moist.

Example XIX

Carbamido-glue prepared according to Example XVII was allowed to react with from 0 to 9% furfuraldehyde (carbamido-glue solids basis) at 120° F. for twenty-four hours. The solutions were divided into two series, one of which was held in solution and the other of which was dried. All samples from both the solution and dry series remained soluble, but there was a visible increase in viscosity with increasing quantities of furfuraldehyde.

Example XX

One hundred fifty (150) gm. Bloom gelatin and 10% urea-basis gelatin were dissolved in water and were then dried, ground, and heated for five hours at 135° C. The resulting carbamido-gelatin material was made up into 35% water solutions and warmed to 120° F. The pH of the solutions was lowered from 6.0 to 4.5 with 25% sulphuric acid, and a solution of formaldehyde in water (7.4% concentration) was added in the manner set forth for carbamido-glue solutions in Example XVI. The same tests were then performed on these solutions as were performed on the carbamido-glue-formaldehyde compositions of Example XVI. The results of these tests were the same using carbamido-gelatin as were obtained using carbamido-glue.

Example XXI

A carbamido-gelatin product prepared as described in Example XX was reacted with acrolein according to the procedure set forth in Example XVIII. The resulting products all remained soluble in water, wet or dried, except for the 6% acrolein composition which was insoluble when dry but soluble when moist.

Example XXII

A carbamido-gelatin composition was prepared as described in Example XX. This material was allowed to react with from 0 to 9% furfuraldehyde (carbamido-gelatin solids basis) at 120° F. for 24 hours. The solutions were divided into two series, one of which was held in solution and the other of which was dried. All samples from both the solution series and dry series remained soluble, but there was a visible increase in viscosity as the quantities of furfuraldehyde employed were increased.

The proteinyl urea or substituted urea compounds described above are believed to possess the general formula:

$$H_2N-CONH-Y-COOH$$

wherein Y designates a protein grouping. They are thought to be analogous to the corresponding ureido derivatives in structure. Additionally, the isocyanic acid reaction product has a low isoelectric point, indicating reaction at the aminoid center. These compounds are not cross-linked in their preparation, which further indicates that the reaction between isocyanic acid and protein takes place only at the aminoid center.

The amount of urea needed to prepare the substituted urea compounds depends upon the number of free amino groups in the protein material. In general, we prefer to use at least about two percent to three percent of urea in our process basis the protein with which it is reacting.

The protein-urea mixture must be heated above the decomposition point of urea (at or slightly below 132.7° C.) in order to release isocyanic acid. We have found that the reaction should be continued for about three hours at 135° C. to prepare our products. The time required is, of course, a function of the reaction temperature and at 150° C. for example, the reaction will take place in as little as one hour.

Obviously, many modifications and variations of the invention as hereinbefore set forth may be made without departing from the spirit and scope thereof, and therefore only such limitations should be imposed as are indicated in the appended claims.

We claim:
1. A method for producing proteinyl urea compound which comprises: mixing urea with proteinaceous material, and thereafter heating the mixture to a temperature at which pyrolyzation of said urea occurs to decompose the urea into ammonia gas and isocyanic acid, whereby said isocyanic acid reacts with said proteinaceous material.

2. A method as in claim 1 wherein the proteinaceous material is animal glue.

3. A method of producing proteinyl urea compound which comprises: forming an aqueous solution of urea and proteinaceous material, removing the water from the mixture at a temperature below about 120° C., and thereafter heating the mixed urea and protein above about 120° C., for a time sufficient to decompose the urea into ammonia gas and isocyanic acid whereby said isocyanic acid reacts with said proteinaceous material.

4. A method for producing proteinyl urea compound which comprises: soaking proteinaceous material in an aqueous urea solution to disperse the urea uniformly throughout said material, drying the said urea-treated material, and thereafter heating the urea and protein to a temperature and for a time sufficient to decompose urea into ammonia gas and isocyanic acid whereby said isocyanic acid reacts with said proteinaceous material.

5. A method for producing proteinyl urea compound which comprises: dissolving urea in an aqueous solution of proteinaceous material, removing the aqueous solvent by drying, whereby sheets of mixed urea and protein are formed, grinding said sheets, and thereafter heating the ground mixture to a temperature and for a time sufficient to decompose the urea into ammonia gas and isocyanic acid whereby said isocyanic acid reacts with said proteinaceous material.

6. A method for producing proteinyl urea compound which comprises: mixing at least about 2% urea with proteinaceous material, and thereafter heating the mixture to a temperature and for a time sufficient to decompose the urea into ammonia gas and isocyanic acid whereby said isocyanic acid reacts with said proteinaceous material.

7. A method for producing proteinyl urea compound which comprises: mixing urea with proteinaceous material, and thereafter heating the mixture to at least about 130° C., and holding that mixture to at least about this temperature for a sufficient period of time to decompose the urea into ammonia gas and isocyanic acid whereby said isocyanic acid reacts with said proteinaceous material.

8. A method for producing proteinyl urea compound which comprises: mixing at least about 2% urea with proteinaceous material, and thereafter heating the mixture to about 135° C. for a period of about five hours whereby the urea is decomposed into ammonia gas and isocyanic acid and whereby said isocyanic acid is reacted with said proteinaceous material.

9. A method for producing proteinyl urea compound which comprises: adding at least about 2% urea to moisture containing proteinaceous material, placing said urea-protein-moisture mixture into a pressure reaction vessel, and thereafter heating the mixture under pressure to a temperature of at least about 120° C. whereby the urea decomposes into ammonia gas and isocyanic acid and whereby said isocyanic acid reacts with said proteinaceous material.

10. A method as in claim 9 wherein the proteinaceous material is selected from the group consisting of hoofs, horns, feathers, hair, bristles, wool, hide trimmings, and offal.

References Cited in the file of this patent

UNITED STATES PATENTS 2,816,099    Young et al. _____ Dec. 10, 1957

OTHER REFERENCES

Sutermeister et al.: "Casein and its Industrial Applications," Second edition, pages 200, 201 and 337 (1939).

Conant et al.: "The Chemistry of Organic Compounds," pages 326–327, Fourth edition, The Macmillan Company, New York (1952).

Noller: "Chemistry of Organic Compounds," page 314, W. B. Saunders Company, Philadelphia (1957).

UNITED STATES PATENT OFFICE
CERTIFICATE OF CORRECTION

Patent No. 3,021,321                              February 13, 1962

Harland H. Young et al.

It is hereby certified that error appears in the above numbered patent requiring correction and that the said Letters Patent should read as corrected below.

Column 1, line 12, for "urean" read -- urea --; line 29, after "compounds" insert a closing parenthesis; column 4, in the table, column 5, sub-heading thereof, for "6.0" read -- 4.0 --; column 7, line 57, for "until" read -- _until_ --; line 58, for "become" read -- became --.

Signed and sealed this 26th day of June 1962.

(SEAL)
Attest:

ERNEST W. SWIDER
Attesting Officer

DAVID L. LADD
Commissioner of Patents